Sept. 11, 1951  E. A. MESSERSCHMIDT  2,567,820
CLEANING MACHINE FOR MACHINE PARTS AND THE LIKE
Filed Jan. 13, 1947  2 Sheets-Sheet 1

Inventor
Ernest A. Messerschmidt

Sept. 11, 1951     E. A. MESSERSCHMIDT     2,567,820
CLEANING MACHINE FOR MACHINE PARTS AND THE LIKE Filed Jan. 13, 1947     2 Sheets-Sheet 2

Inventor
Ernest A. Messerschmidt

By Clarence A. O'Brien
and Harvey B. Jacobson
Attorneys

Patented Sept. 11, 1951

2,567,820

UNITED STATES PATENT OFFICE 2,567,820

CLEANING MACHINE FOR MACHINE PARTS
AND THE LIKE

Ernest A. Messerschmidt, Newark, Ohio

Application January 13, 1947, Serial No. 721,851

1 Claim. (Cl. 134—138)

This invention relates to an improved machine for use in cleaning small parts of machines, instruments and the like, and has more particular reference to such a machine in which a basket containing the parts to be cleaned is rotated within a receptacle containing a cleaning liquid.

An important object of the invention is to provide a machine of the above kind in which rotation of the basket is effected by the action of a fluid jet against vanes of the basket.

Another object is to provide fluid jet means for agitating the cleaning liquid to enhance the cleaning action afforded by rotating the basket.

A further object is to provide a basket supporting and driving unit which is placed in and upon the bottom of the cleaning liquid receptacle and bodily removable from the latter to facilitate removal of dirt and sediment from said receptacle as desired from time to time.

Still another object of the invention is to provide a basket supporting and driving unit which is simple and durable in construction and which embodies a rigid frame composed of tubular members, certain ones of which conduct the fluid under pressure from a pressure fluid supply pipe to the nozzles which discharge the fluid jets for rotating the basket and agitating the cleaning liquid.

Other objects and features of the invention will become apparent from the following description when considered in connection with the accompanying drawings, in which.

Referring in detail to the drawings, the present machine comprises a box-like receptacle or tank 5 for containing a cleaning liquid or solution, and a basket supporting and driving unit 6 removably disposed within the receptacle or tank 5, said receptacle or tank 5 having an openable lid or cover 7.

Figure 4:
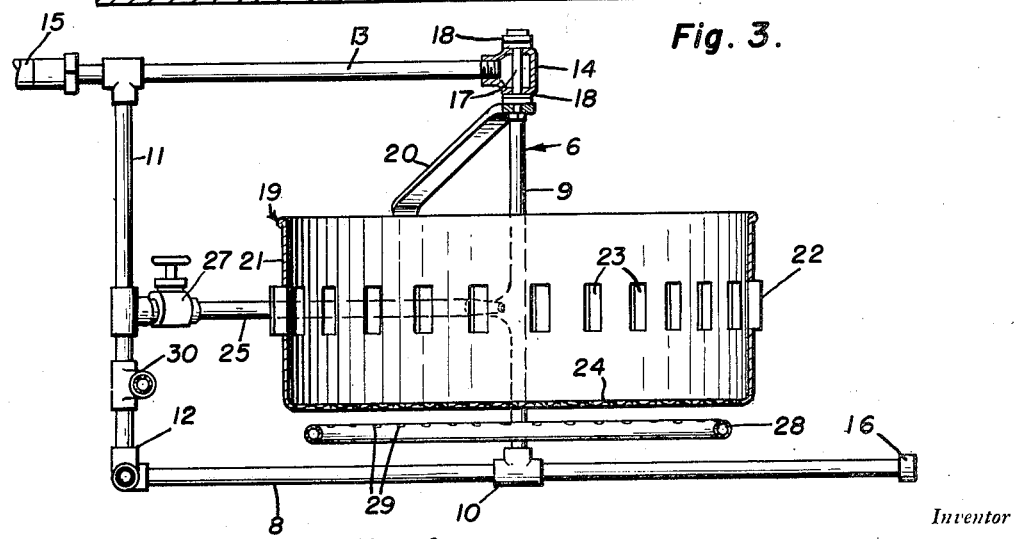
Figure 4 is a view of the basket supporting and driving unit, partly in side elevation and partly in central vertical section on line 4—4 of Figure 3.

The unit 6 is shown as including a rigid supporting frame composed of a tubular horizontal base member 8 of U-shape in plan and constructed of suitably coupled pipe sections, a tubular vertical member 9 which is of inverted U-shape and connected at its ends to the leg or end portions of the base member 8 intermediate the ends of said leg or end portions as at 10, a tubular upright member 11 connected at its lower end to the base member 8 as at 12 intermediate the ends of the latter, and a horizontal tubular member 13 connecting the upper end of the upright member 11 with the intermediate portion of the U-shaped member 9. The members of the frame are all constructed of pipe sections which are in communication with each other, and the member 9 comprises two similar half sections joined together and to the member 13 by a T-fitting 14. A compressed air supply pipe 15, which leads from any suitable source of air under pressure, is connected with the upper end of the upright member 11 of the frame, and the ends of the base member 8 are suitably closed by means of caps 16 or the like. The T-fitting 14 has a vertical spindle 17 extended therethrough and journalled therein upon thrust bearings 18, and a basket 19 for receiving the parts to be cleaned is suspended from the lower end of the spindle 17 for rotation with the latter. For this purpose, the basket 19 has a handle-like bail 20 fixed thereto, said bail having the spindle 17 extended centrally therethrough as shown in Figure 4 so that the basket is freely rotatable about its vertical axis.

The basket 19 preferably has a sheet metal cylindrical wall 21 from which is struck a circular series of uniformly spaced outwardly projecting vanes 22. The vanes 22 are preferably of vertically elongated form and provided intermediate the top and bottom of the basket, and it will be seen that when the vanes are struck from the wall 21 openings 23 are formed therein. The basket 19 also has a foraminous bottom wall 24, and it is disposed so that its bottom wall is located a slight distance above the base member 8 of the frame.

Figure 1:
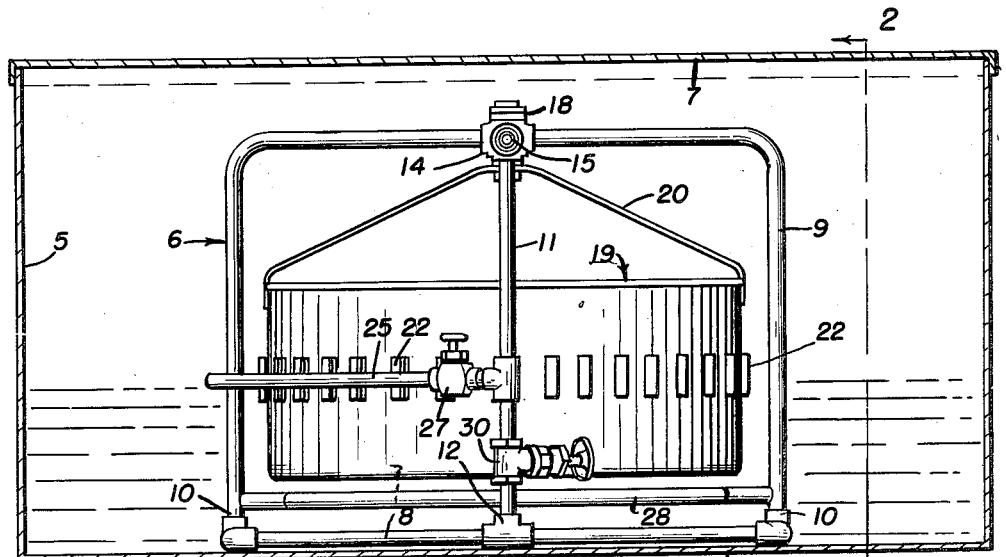
Figure 1 is a view, partly in elevation and partly in vertical section, of a machine constructed in accordance with the present invention.
Figure 2:
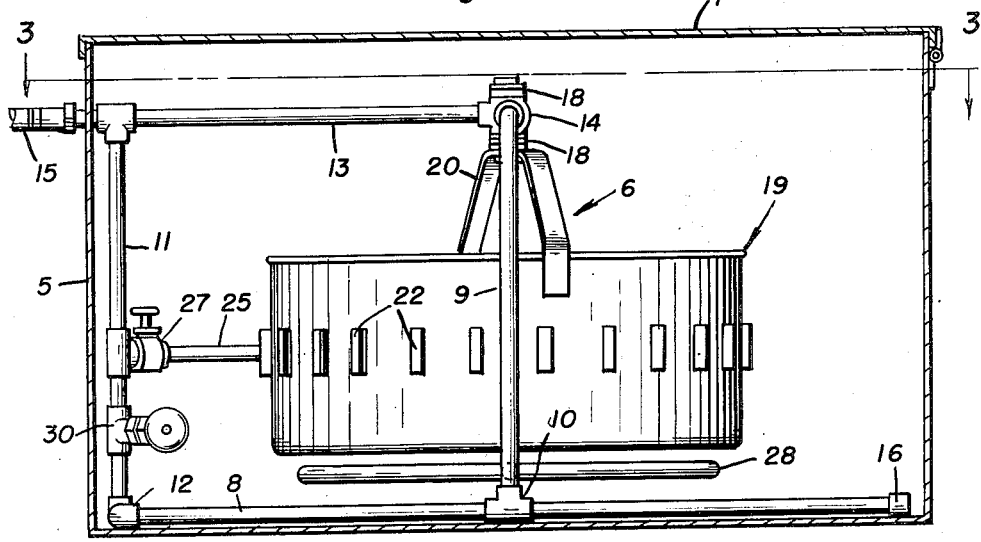
Figure 2 is a vertical section taken on line 2—2 of Figure 1.
Figure 3:
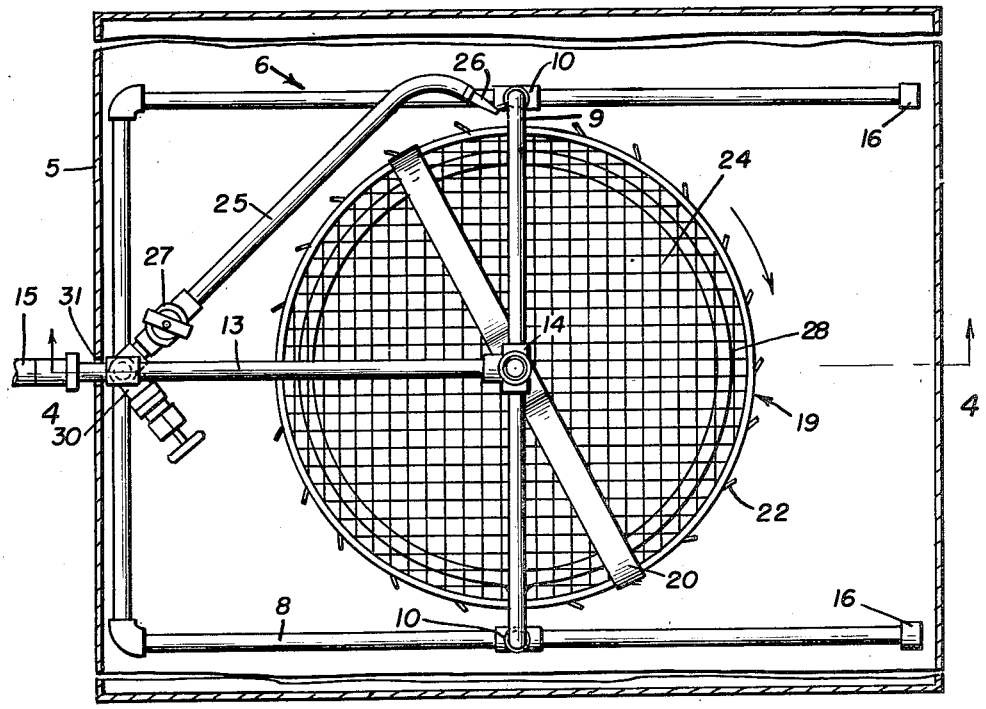
Figure 3 is a horizontal section taken on line 3—3 of Figure 2.

Attached to and communicating with the upright member 11 of the frame is an elongated nozzle 25 that extends to one side of the basket 19 and has an inwardly directed discharge end 26 disposed tangentially of the basket 19 so as to properly act upon the tangentially disposed vanes 22 for causing efficient driving of the basket in a clockwise direction as viewed in Figure 3. In other words, the air under pressure discharging from the nozzle 25 acts upon the vanes 22 so as to rotatably drive the basket. The volume of air discharged from nozzle 25 may be varied by a control valve 27 of the nozzle, thereby regulating the speed of rotation of the basket.

Horizontally disposed directly beneath and concentric with the basket 19 is a circular nozzle 28 located slightly above the base member 8 of the frame and disposed between and connected to the end portions of the U-shaped frame member 9 in communication with the latter. The nozzle 28 has a circular series of perforations 29 near the top which cause jets of air to be discharged upwardly against the bottom 24 of the basket in slightly upwardly converging relation. As the nozzle 28 is below the level of the cleaning liquid, the jets of air discharging therefrom will cause effective agitation of the cleaning liquid so as to enhance the cleaning action afforded by the rotation of the basket itself. Interposed in the vertical frame member 11 at a point below the nozzle 25 is a control valve 30 for regulating the volume of air under pressure supplied to the nozzle 28 and thereby regulating the agitation of the cleaning liquid. It will of course be understood that the compressed air flows from supply pipe 15 to nozzle 25 through frame member 11 and to nozzle 28 through frame member 11 and base member 8 with which the frame member 9 and nozzle 28 communicate.

As shown in the several views, the base member 8 of the frame rests upon the bottom of the receptacle or tank 5, the front wall of said receptacle or tank 5 being provided at the top with a vertical slot 31 (Fig. 3) which extends through the upper edge of said front wall and accommodates the pipe 15 so as to permit the unit 6 to be bodily lifted out of the receptacle or tank 5 when it is desired to remove sediment or dirt from the latter. To permit this, the pipe 15 is preferably in the nature of a flexible hose or pipe. It will of course be apparent that the jet of air discharging from nozzle 25 will also cause agitation of the cleaning liquid, and when the basket is caused to rotate the cleaning liquid effectively circulates through the basket by reason of the openings 23 and the foraminous bottom wall 24.

When using the machine or device, the cover 7 is opened, and the parts to be cleaned are placed in the basket 19. The valves 27 and 30 are then opened to the desired degree and the cover 7 is then closed. The air discharging from nozzle 25 acts upon the vanes 22 so as to rotate the basket 19, and the jets of air discharging from nozzle 28 effectively agitate the cleaning liquid and drive it upwardly through the bottom wall 24 of the basket. This agitation of the cleaning liquid and the rotation of the basket provides a cleaning action which insures thorough cleaning of the parts placed in the basket.

From the foregoing description, it is believed that the construction, operation and advantages of the present invention will be readily understood and appreciated by those skilled in the art. Modifications and changes in details of construction illustrated and described are contemplated, such as fall within the scope of the invention as claimed.

What I claim is:

A cleaning machine of the character described comprising a receptacle for containing a cleaning liquid, and a basket supporting and driving unit removably disposed within said receptacle, said unit comprising a rigid frame having a U-shaped base member resting on the bottom of said receptacle, an inverted vertical U-shaped member connected at its ends to the base member, a tubular upright member connected to the vertical inverted U-shaped member and the base, a circular basket for containing the parts to be cleaned suspended from the intermediate portion of said inverted U-shaped frame member for rotation about its vertical axis, a nozzle carried by and communicating with said upright member, louver-like vanes on the basket, said nozzle being disposed to discharge a jet of fluid against said vanes to rotatably drive said basket, and a fluid pressure supply pipe communicating with the upper end of said upright frame member, said upright frame member providing a passage for fluid from the supply pipe to the nozzle.

ERNEST A. MESSERSCHMIDT.

REFERENCES CITED

The following references are of record in the file of this patent:

UNITED STATES PATENTS

| Number | Name | Date |
| --- | --- | --- |
| 817,801 | Pittock | Apr. 17, 1906 |
| 1,049,896 | Miller | Jan. 7, 1913 |
| 1,208,706 | Hatfield | Dec. 12, 1916 |
| 1,405,243 | Wing | Jan. 31, 1922 |
| 1,409,571 | Putman | Mar. 14, 1922 |
| 1,574,452 | South | Feb. 23, 1926 |
| 1,653,577 | Krafft | Dec. 20, 1927 |
| 1,949,814 | Replogle | Mar. 6, 1934 |
| 2,184,204 | Walker | Dec. 19, 1939 |
| 2,241,940 | Atkins et al. | May 13, 1941 |